(12) United States Patent
Stählin et al.

(10) Patent No.: US 9,344,503 B2
(45) Date of Patent: May 17, 2016

(54) INTERFACE DEVICE, VEHICLE COMMUNICATION UNIT EQUIPPED WITH AN INTERFACE DEVICE AND USE OF A VEHICLE COMMUNICATION UNIT IN THE VEHICLE-TO-ENVIRONMENT COMMUNICATION

(75) Inventors: Ulrich Stählin, Eschborn (DE); Marc Menzel, Weimar/Lahn (DE)

(73) Assignee: Continental Teves AG & Co. oHG (DE)

( * ) Notice: Subject to any disclaimer, the term of this patent is extended or adjusted under 35 U.S.C. 154(b) by 551 days.

(21) Appl. No.: 13/375,298

(22) PCT Filed: May 28, 2010

(86) PCT No.: PCT/EP2010/057499
§ 371 (c)(1),
(2), (4) Date: Mar. 28, 2012

(87) PCT Pub. No.: WO2010/139648
PCT Pub. Date: Dec. 9, 2010

(65) Prior Publication Data
US 2012/0177061 A1     Jul. 12, 2012

(30) Foreign Application Priority Data
Jun. 4, 2009   (DE) .................. 10 2009 026 761

(51) Int. Cl.
*H04L 29/08* (2006.01)
*H04L 29/06* (2006.01)

(52) U.S. Cl.
CPC ............... *H04L 67/12* (2013.01); *H04L 69/08* (2013.01)

(58) Field of Classification Search
CPC .. H04L 67/12; H04L 69/08; G08G 1/00–1/22
USPC .......... 370/328–338, 400, 401, 463, 465–467
See application file for complete search history.

(56) References Cited

U.S. PATENT DOCUMENTS

| 7,484,008 | B1 * | 1/2009 | Gelvin et al. ................ 709/249 |
| 2003/0063015 | A1 * | 4/2003 | Ebner et al. .................. 701/117 |
| 2005/0137786 | A1 | 6/2005 | Breed | |
| 2005/0282586 | A1 * | 12/2005 | Rutherford .......... H01Q 1/1207 455/562.1 |

(Continued)

FOREIGN PATENT DOCUMENTS

| CN | 201717878 U | 1/2011 |
| EP | 1475923 A2 | 11/2004 |

(Continued)

OTHER PUBLICATIONS

Chinese Office Action for 201080024320.0 dated Jan. 2, 2014.
International Preliminary Report on Patentability for PCT/EP2010/057499 dated Dec. 6, 2011.

*Primary Examiner* — Pao Sinkantarakorn
(74) *Attorney, Agent, or Firm* — RatnerPrestia

(57) ABSTRACT

An interface device having a first connection to a vehicle communication unit which is designed to carry out a vehicle-to-environment communication is described, the interface device having a second connection to an infrastructure unit and a computing unit which is designed to convert the signals between the first and second connections. In addition, a vehicle communication unit equipped with the interface device and a use of a vehicle communication unit are described.

11 Claims, 3 Drawing Sheets

(56) References Cited

U.S. PATENT DOCUMENTS

2006/0068776 A1\* 3/2006 Araki .................. 455/426.2
2007/0086482 A1 4/2007 Pruzan et al.

FOREIGN PATENT DOCUMENTS

| EP | 1956794 A2 | 8/2008 |
| WO | WO 97/26750 | 7/1997 |

\* cited by examiner

INTERFACE DEVICE, VEHICLE COMMUNICATION UNIT EQUIPPED WITH AN INTERFACE DEVICE AND USE OF A VEHICLE COMMUNICATION UNIT IN THE VEHICLE-TO-ENVIRONMENT COMMUNICATION

CROSS REFERENCE TO RELATED APPLICATIONS

This application is the U.S. National Phase Application of PCT International Application No. PCT/EP2010/057499, filed May 28, 2010, which claims priority to German Patent Application No. 10 2009 026 761.1, filed Jun. 4, 2009, the contents of such applications being incorporated by reference herein.

FIELD OF THE INVENTION

The invention relates to an interface device having a first connection to a vehicle communication unit which is designed to carry out a vehicle-to-environment communication (C2X communication). A vehicle-to-environment communication is understood to mean both a vehicle-to-vehicle communication (C2C) as well as a vehicle-to-vehicle infrastructure communication (C2I). In addition, the invention relates to a vehicle communication unit equipped with this interface device as well as to the use of a vehicle communication unit in the vehicle-to-environment communication.

BACKGROUND OF THE INVENTION

Vehicles (C2C) and infrastructure units (C2I) are typically involved in vehicle-to-environment communication (C2X). For this purpose, vehicle communication units which meet the typical automotive requirements, in particular cover large temperature ranges and have a high degree of safety and low power consumption, are used in vehicles. These vehicle communication units are also referred to as vehicle routers within the scope of vehicle-to-environment communication. With respect to the communication technology, the infrastructure units, which are also referred to as roadside units (RSU), have basically similar requirements.

US 2005/0137786 A1, which is incorporated by reference, discloses, inter alia, a system in which traffic lights at intersections in a vehicle-to-infrastructure communication output a stop signal if the traffic lights display a red stop signal. In this way, the driver can be assisted in also complying with the signal. However, various devices with different interfaces are typically used as communication devices for the vehicle units (OBU—On Board Units) and the infrastructure units (RSU—Road Side Units).

SUMMARY OF THE INVENTION

The present invention therefore aims to combine the communication units of the vehicles and those of the infrastructure devices.

This is achieved according to aspects of the invention, an interface device having a first connection to a vehicle communication unit which is designed to carry out a vehicle-to-environment communication, wherein the interface device has a second connection to an infrastructure unit and a computing unit which is designed to convert the signals between the first and second connections, having a connection to a vehicle communication system, wherein an interface device is integrated into the vehicle communication unit, which interface device is connected by its first connection to the connection for the vehicle communication system of the vehicle communication unit, and having an antenna unit or a connection for an antenna unit which is designed to output data via the vehicle-to-environment communication, in an infrastructure unit which takes part in the vehicle-to-environment communication, wherein the computing unit is designed to make available the information which is typical of the infrastructure unit, for outputting in the vehicle-to-vehicle communication.

In the interface device which is proposed according to aspects of the invention, in addition to the first connection to a vehicle communication unit, a second connection to an infrastructure unit and to a computing unit are provided, which computing unit is designed to convert the signals between the first and second connections. The interface device can therefore be connected in or intermediately connected between a control device of an infrastructure unit which controls the outputting of data of the infrastructure unit, and a vehicle communication unit, with the result that the vehicle communication unit can also be used as a communication unit of the infrastructure units without further changes.

Instead of developing and manufacturing two or more different communication units, the vehicle communication unit is thus also used according to aspects of the invention in the infrastructure units. For this purpose, the typical vehicle interfaces such as a CAN bus, Flexray, MOST or else Ethernet are converted to the typical interfaces of the infrastructure operators. This also simplifies inter-operability between the vehicle units and infrastructure units since the technical processing of the communication is achieved by the same communication units.

According to one preferred embodiment, the computing unit can be designed to parameterize the first and/or second connections and therefore adapt them to the respective conditions of the infrastructure units which are present. The interface landscape of the infrastructure units is typically very heterogeneous. For example, in Germany each federal state has different interfaces which have to be served. The possibility of simple parameterization of the interface device according to aspects of the invention therefore makes it possible also to deal with the necessary interface conversion and to implement uniform communication despite the different interfaces with the infrastructure units.

In one specific configuration, the first connection can have connecting means to a vehicle communication system, in particular a vehicle bus, such as a CAN Bus, Flexray, MOST or the like. In addition, connecting means for an IP-based network connection, in particular Ethernet, for a wireless connection, in particular WLAN or Bluetooth, and/or a wire-bound connection, in particular USB, but also proprietary connections, can also be provided. The first connection preferably at the same time has a plurality of different connecting means, with the result that the interface device can be used universally. An interface unit which has at least one connection with connecting means to one or more different vehicle communication bus(es) and an Ethernet connection is particularly preferred.

In order to achieve simple parameterization of the second connection, the first connection can, according to one preferred embodiment, be designed to access the computing unit of the interface device by means of, in particular, an external computing unit which is connected via the first connection, and to carry out programming and/or parameterization of the second connection. This includes both the design of the second interface and programming of the interface function with which the data are converted from the one connection to the other connection.

In addition, the interface device can, according to aspects of the invention, be designed in such a way that a firewall function is also implemented in the computing unit. As a result, despite stringent safety requirements which are made of the infrastructure units the development cycles of the vehicle industry can be accompanied with respect to the actual communication technology since nothing has to change on the interface and only the vehicle router (vehicle communication unit) which is used in the vehicle-to-environment communication has to be replaced. Since the vehicle communication unit generally also has a separate security concept, the provision of an interface device with an additional Firewall increases the overall security of the infrastructure unit further. This is a large advantage in particular in the case of critical infrastructure units such as traffic lights or the like.

According to one preferred embodiment, the interface device according to aspects of the invention can be embodied as a converter card, in particular for integration into a vehicle communication unit or into an infrastructure control unit. Such a converter card is particularly space-saving and can easily be integrated into the existing communication units or control units of the infrastructure units, wherein for the purpose of connection the suitable connections are provided with corresponding interface conversion.

The invention also relates to a vehicle communication unit having a computing unit which is designed to carry out a vehicle-to-environment communication, and having a connection to a vehicle communication system, wherein an interface device as claimed in claim 12 is integrated into the vehicle communication unit, which interface device is connected by its first connection to the connection for the vehicle communication system of the vehicle communication unit. Said unit has a computing unit which is designed to carry out a vehicle-to-environment communication, in particular according to the ITS-G5-Standard corresponding to IEEE 802.11p, and a connection for a vehicle communication system. According to aspects of the invention, the vehicle communication unit is also integrated into the interface device which is described above and which is connected by its first connection to the connection for the vehicle communication system of the vehicle communication unit. Such a vehicle communication unit can be used directly as a communication unit for an infrastructure unit.

In particular when ITS-G5 or DSRC according to IEEE 802.11p or IEEE 1609 or the communication corresponding to C2C-CC (Communication Consortium) is applied, there is no master router in the network and therefore no difference in the network behavior between a vehicle router and an infrastructure router. For this reason, from the technical point of view the communication units can be of identical design and the communication protocol stack (Stack) which is processed in the communication units can to a large extent remain exactly the same, in particular with respect to the technical execution of the communication. There are differences only on the application side. These differences are, however, already implemented in the vehicle to some extent by control devices which differ from the vehicle communication unit.

These control devices are usually connected via a typical vehicle communication system, with the result that all the necessary data and access possibilities can be made available via these interfaces. This makes universal use of the vehicle communication units simple for infrastructure units also.

In one embodiment with a particularly high degree of integration, the vehicle communication unit can also provide an antenna unit or a connection for an antenna unit which is designed to output the data via the vehicle-to-environment communication in particular according to the ITS-G5-Standard corresponding to IEEE 802.11p. For this purpose, either a computing unit in the antenna unit and/or a computing unit of the vehicle communication unit can be designed to process the corresponding communication protocol stack. The processing can, of course, also take place in a way which is distributed between both computing units, in which case the antenna unit then processes the layers of the protocol which are closer to the hardware, and the computing unit of the vehicle communication unit processes the layers of the protocol which are closer to the application.

In this way the antenna concepts from the vehicle development can also be adopted for the infrastructure units, in which context the cables between the antenna and transceivers are kept as short as possible by integrating the transceivers directly into the antenna housing. All the useful data are subsequently combined on a vehicle bus and therefore made available in the vehicle. This architecture also permits the antenna to be located in a flexible way in the infrastructure units. It is therefore possible to install the antennas at a spatial distance from switch cabinets which are formed as infrastructure control units, without a large degree of expenditure, and to bring about optimum radio coverage in the desired area.

In a further development of this inventive idea, the antenna unit can also be designed to carry out cellular communication and/or have additional communication devices. The latter can also be used by the infrastructure unit, with the result that in particular in the case of new installations it is possible to dispense with costly cabling of the infrastructure units, under certain circumstances with optical fiber cables. This is advantageous in particular in sparsely populated regions on country roads or the like when, for example, an infrastructure unit is intended to indicate a particularly dangerous bend.

In particular for these infrastructure units which are not connected to a cable network it is possible for the vehicle communication unit which is to be used in the infrastructure unit to have, as an energy supply, a solar cell and/or a wind turbine or connections for connecting a solar cell and/or a wind turbine. The vehicle communication unit can therefore be used as an autonomous unit together with the infrastructure units.

According to a further aspect of the present invention, the use of a vehicle communication unit having a computing unit which is designed to carry out a vehicle-to-environment communication, in particular according to the ITS-G5-Standard corresponding to IEEE 802.11p, is also covered. The vehicle communication unit is preferably also equipped with an antenna unit or a connection for an antenna unit which is designed to output data via the vehicle-to-environment communication. The vehicle communication unit is intended to be used in an infrastructure unit which takes part in the vehicle-to-environment communication, wherein the computing unit of the vehicle communication unit is designed to make available independently the information which is typical for the infrastructure unit, for outputting in the vehicle-to-vehicle communication.

In this case, it is possible to dispense with an interface to an infrastructure control unit. This can apply, for example, to road signs with a speed restriction which only have to output the value of the permitted speed. This does not require a costly controller. The actuation can easily be performed directly by the vehicle communication unit, which therefore becomes an infrastructure unit.

The use of customary vehicle communication units in infrastructure units by means of an interface conversion from the vehicle interfaces to the infrastructure interfaces facilitates inter-operability, and the certification expenditure on the manufacture of infrastructure units is reduced.

In addition, problems arising from different implementations of the communication units are taken out of the overall system. As a result of the scale effects which are achieved in this way in view of the numbers of the vehicle communication units, a significantly lower price for the infrastructure units than in the case of corresponding in-house developments should be achieved.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
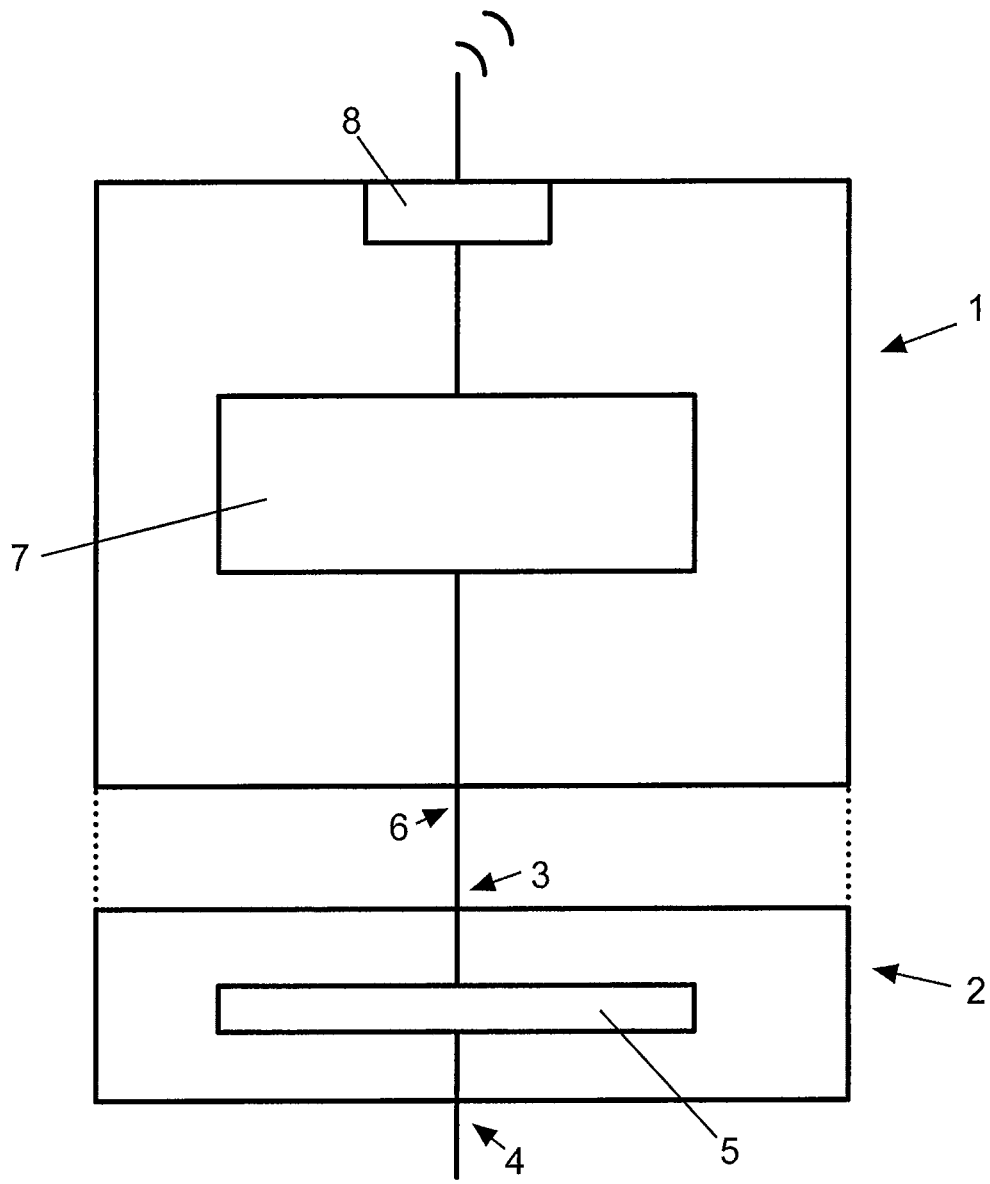
FIG. 1 is a schematic view of the design of an interface device according to aspects of the invention integrated into a vehicle communication unit according to a first embodiment.

FIG. 1 illustrates a vehicle communication unit 1 according to aspects of the invention in which an interface device 2 according to aspects of the invention is integrated, as is shown by the dashed connection between the vehicle communication unit 1 and the interface device 2.

The interface device 2 has a first connection 3 to the vehicle communication unit 1 which is designed to carry out a vehicle-to-environment communication. In addition, a second connection 4 to an infrastructure unit (not illustrated here) is provided in the interface device 2. The first connection 3 and the second connection 4 are connected to one another via a computing unit 5 in the interface device 2, said computing unit 5 being designed to convert the signals between the first and second connections 3, 4. This interface device makes it possible also to use the vehicle communication unit 1 as a communication unit for an infrastructure unit which is actuated as desired.

The vehicle communication unit 1 is of conventional design here and has a connection 6 for a vehicle communication system, which connection 6 is connected to the first connection 3 of the interface device 2. Data from the vehicle are usually output to the communication unit for transmission and received data passed on from the communication unit to vehicle units via this connection for a vehicle communication system.

This connection 6 is connected to a computing unit 7 of the vehicle communication unit 1 which is designed to carry out a vehicle-to-environment communication, and processes the corresponding communication protocol stack in order to carry out the communication. The computing unit 7 is connected to an antenna unit 8 which is integrated into the vehicle communication unit 1 and which has an antenna and the driver elements which are required for outputting.

In an alternative configuration, the vehicle communication unit can also have a connection for an external antenna unit.

In addition, the antenna unit 8 can also be designed to take part in a cellular radio communication, in addition to the vehicle-to-environment communication. This integrated communication unit 1 with the interface device 2 can therefore be used directly in infrastructure units.

Figure 2:
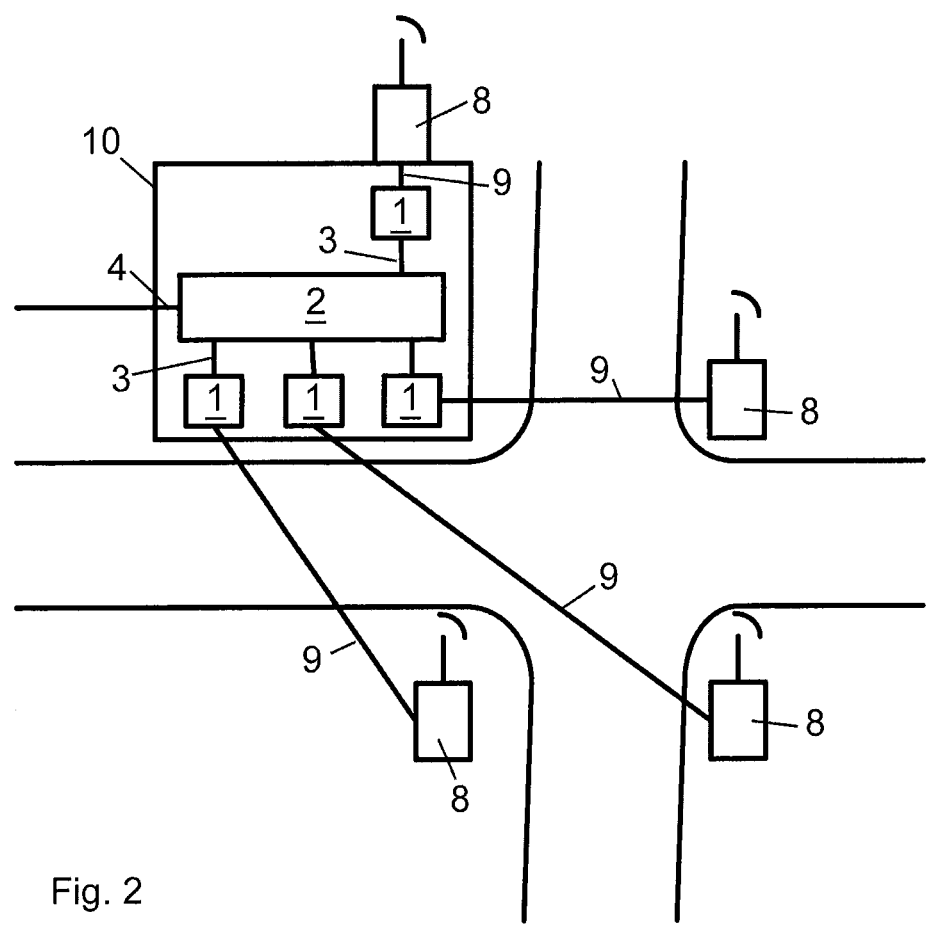
FIG. 2 shows the use of a second embodiment according to aspects of the present invention.

An application example of an embodiment of an interface device 2 according to aspects of the invention which differs slightly and has corresponding vehicle communication units 1 is illustrated in FIG. 2. At an intersection with poor visibility, a plurality of antenna units 8 have to be mounted in order to supply all the roads reliably with radio signals for vehicle-to-environment communication. For this purpose, integrated antenna units 8, i.e. antennas with integrated transceivers, such as are also known from vehicle construction are used. Said antennas can be located at the optimum positions, as illustrated in FIG. 2.

The power supply and the data connection are each carried out by means of a cable 9 which leads to a central location at the intersection at which a central control unit 10, for example in the form of a switch cabinet, is located. A plurality of vehicle communication units 1 which are referred to as vehicle routers are provided in this central control unit 10, wherein in each case a vehicle communication unit 1 is assigned to an antenna unit 8 in order to carry out data pre-processing.

All the vehicle communication units 1 are connected to a central interface device 2 which converts the data of all the vehicle communication units 1 to the infrastructure interface of the second connection 4. The use of the interface device 2 according to aspects of the invention and of the communication technology which is already known from vehicle construction makes equipping the intersection with infrastructure units comparatively easy since all that is necessary is to lay cables 9 to the integrated antenna units 8.

In another embodiment, the vehicle communication units 1 can also be integrated completely into the respective antenna units 8, with the result that all that is necessary then is to form the connection between the interface device 2 and respective integrated antenna units 1, 8.

Figure 3:
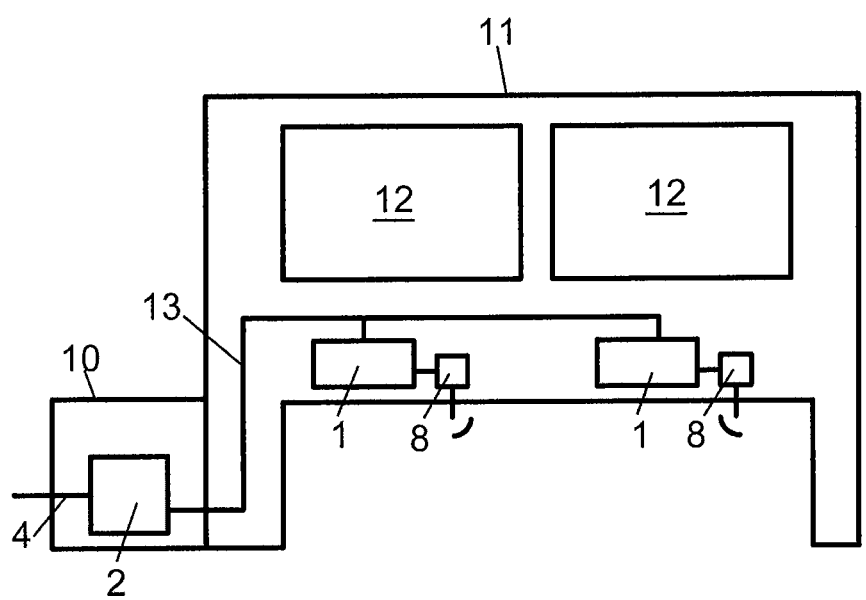
FIG. 3 shows the use of a third embodiment according to aspects of the present invention.

In a further embodiment which is illustrated in FIG. 3, a road sign bridge 11 is to be expanded with the possibility of vehicle-to-environment communication as an infrastructure unit. Since a power supply is already available for the individual road signs 12 of the road sign bridge 11 at a location which is optimum for placing the antennas, simple vehicle communication units 1 without an integrated antenna can be used here and antennas 8 can be mounted on the road sign bridge 11 in the vicinity of the vehicle communication units 1. The vehicle communication units 1 are connected via the customary connection 6 to a vehicle communication system by means of bus cables 13 at a central location, for example in a central control unit 10, to an interface device 2 via the first connection 3. The interface device 2 has a second connection 4 to an infrastructure unit and converts the infrastructure interface to a normal vehicle communication interface. The retrofitting of the road sign bridge 11 with vehicle-to-environment communication is also possible here without a large amount of technical expenditure.

According to a further embodiment of the invention which is not illustrated in a figure, a conventional vehicle communication unit 1 can also be used as a communication unit for an infrastructure unit without further adaptation and without an interface device 2. For example, at a remotely located part of a motorway which is at risk of traffic jams and in which there is neither a power supply nor a data connection available is to be equipped with an infrastructure unit.

For this purpose, an autonomous vehicle communication unit with a power supply by means of a solar cell and/or a wind turbine is installed. For the purpose of communication, use is made of a vehicle communication unit 1 with an integrated antenna unit 8 which assists both the C2X communication and a cellular radio communication on the basis of, for example, UMTS. Since this infrastructure unit is to be mainly used only for collecting data and to output warnings of traffic jams, there is no need for conversion to an interface of the infrastructure unit. Instead, the applications are implemented directly at the computing unit 7 of the vehicle communication unit 1 by virtue of their low computing and storage requirement, with the result that there is no need for any additional electronics. The computing unit can also be integrated directly into the antenna unit here, with the result that apart from the integrated antenna unit no further units are necessary.

The proposal according to aspects of the invention therefore unifies the vehicle-to-environment communication from the technical point of view since the same communication technology is used both for the vehicles and for the infrastructure units. If appropriate, conversion to infrastructure interfaces can be carried out by means of an interface device according to aspects of the invention.

LIST OF REFERENCE NUMBERS

1 Vehicle communication unit
2 Interface device
3 First connection
4 Second connection
5 Computing unit of the interface device
6 Connection to a vehicle communication system
7 Computing unit of the vehicle communication unit
8 Antenna unit
9 Cable
10 Central control unit
11 Road sign bridge
12 Road sign
13 Bus cable

The invention claimed is:

1. An interface device positioned adjacent to a road on which vehicles travel, including:
   a first wired connection to a vehicle communication unit, the vehicle communication unit being positioned adjacent to the road designed to carry out wireless communication with the vehicles traveling on the road through a connected external antenna unit located remote from the vehicle communication unit, the external antenna unit includes an antenna and driver elements, the vehicle communication unit communicating with the vehicles exclusively through the connected external antenna unit,
   a second wired connection to an infrastructure unit located remote from the vehicle communication unit, the infrastructure unit being designed to communicate with the vehicle communication unit through the interface device,
   wherein the first and second wired connections of the interface device are programmed by a computing unit of the vehicle communication unit to perform a specified type of conversion, and
   wherein the interface device converts signals exchanged between the vehicle communication unit and the infrastructure unit through the first and second connections based on the specified type of conversion programmed into the interface device by the computing unit.

2. The interface device as claimed in claim 1, wherein the interface device is designed to parameterize the first and/or second connections.

3. The interface device as claimed in claim 1, wherein the first connection has connecting means to a vehicle communication system for an IP-based network connection, a wireless connection and/or a wire-bound connection.

4. The interface device as claimed in claim 1, wherein the first connection is designed to access a computing unit of the vehicle communication unit and to carry out programming and/or parameterization of the second connection.

5. The interface device as claimed in claim 1, wherein a firewall function is also implemented in the interface device.

6. The interface device as claimed in claim 1, wherein the interface device is embodied as a converter card.

7. A vehicle communication unit positioned adjacent to a road on which vehicles travel including:
   a computing unit which is designed to carry out a vehicle-to-environment communication through an external antenna unit connected to the vehicle communication unit, the external antenna unit located remote from the vehicle communication unit, the external antenna unit includes an antenna and driver elements, the vehicle communication unit communicating with the vehicles exclusively through the connected external antenna unit,
   a wired connection to an interface device positioned adjacent to the road on which the vehicles travel,
   wherein the wired connection of the interface device is programmed by the computing unit to perform a specified type of conversion, and
   wherein the interface device is designed to convert signals exchanged between the vehicle communication unit and an infrastructure unit based on the specified type of conversion programmed into the interface device by the computing unit.

8. The vehicle communication unit as claimed in claim 7, wherein the external antenna unit or a connection to the external antenna unit is designed to output data via the vehicle-to-environment communication.

9. The vehicle communication unit as claimed in claim 8, wherein the external antenna unit is designed to carry out a cellular communication.

10. The vehicle communication unit as claimed in claim 7, wherein the vehicle communication unit has, as an energy supply, a solar cell and/or a wind turbine or connections for connecting a solar cell and/or a wind turbine.

11. A vehicle communication unit positioned adjacent to a road on which vehicles travel, including:
   a computing unit including a processor which is designed to carry out a vehicle-to-environment communication through an external antenna unit connected to the vehicle communication unit, the external antenna unit located remote from the vehicle communication unit, the external antenna unit includes an antenna and driver elements, the vehicle communication unit communicating with the vehicles exclusively through the connected external antenna unit, the external antenna unit is designed to output data via the vehicle-to-environment communication, to an infrastructure unit which takes part in the vehicle-to-environment communication, and
   a wired connection to an interface device positioned adjacent to the road on which the vehicles travel,
   wherein the wired connection of the interface device is programmed by the computing unit to perform a specified type of conversion, and
   wherein the interface device is designed to convert signals exchanged between the vehicle communication unit and an infrastructure unit based on the specified type of conversion programmed into the interface device by the computing unit.

\* \* \* \* \*